(12) United States Patent
Yoshizaki et al.

(10) Patent No.: US 6,245,263 B1
(45) Date of Patent: *Jun. 12, 2001

(54) PROCESS OF INJECTION MOLDING A FOAMABLE PLASTIC COMPOSITION

(75) Inventors: Michio Yoshizaki; Koichi Honda, both of Ichihara (JP)

(73) Assignee: Chisso Corporation, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/242,820
(22) PCT Filed: Sep. 13, 1996
(86) PCT No.: PCT/JP96/02640
  § 371 Date: Feb. 24, 1999
  § 102(e) Date: Feb. 24, 1999
(87) PCT Pub. No.: WO98/10913
  PCT Pub. Date: Mar. 19, 1998
(51) Int. Cl.$^7$ .................................................. B29C 44/06
(52) U.S. Cl. ......................... 264/45.5; 264/54; 264/328.7
(58) Field of Search .............................. 264/45.5, 328.7, 264/54; 428/318.8, 71

(56) References Cited

U.S. PATENT DOCUMENTS

| | | | |
|---|---|---|---|
| 5,252,269 | * 10/1993 | Hara et al. | 264/54 |
| 5,281,376 | * 1/1994 | Hara et al. | 264/464 |
| 5,292,465 | * 3/1994 | Kobayashi et al. | 264/328.7 |
| 5,437,823 | * 8/1995 | Hettinga et al. | 264/45.5 |

FOREIGN PATENT DOCUMENTS

| | | |
|---|---|---|
| 62-246710 | 10/1987 | (JP) . |
| 4-214311 | 8/1992 | (JP) . |

OTHER PUBLICATIONS

"Injection Molding", Shoji Seto supervision, 8th edition, K.K. Plastics Age, Oct. 1, 1978, pp. 339–340.

* cited by examiner

Primary Examiner—Allan R. Kuhns
(74) Attorney, Agent, or Firm—McDermott, Will & Emery

(57) ABSTRACT

A process of injection molding a foamable plastic composition which comprises filling completely a molten foamable plastic composition into a cavity, while reducing a volume of the cavity in the middle of injection or immediately after injection; cooling the composition to the state wherein a solidified layer in contact with a mold surface mingles with a molten inside layer; enlarging the volume of the cavity to that of the desired molded article; and after further cooling, removing the molded plastic foam article. This molded article comprises a layer having a non- or low-foamed, dense structure on the surface and a high-foamed layer at the inside, and has a light weight, good appearance and stiffness.

4 Claims, 2 Drawing Sheets

PROCESS OF INJECTION MOLDING A FOAMABLE PLASTIC COMPOSITION

TECHNICAL FIELD

This invention relates to a process of injection molding a foamable plastic composition. More particularly, the invention relates to a process of injection molding a molded plastic foam article having a light weight, good thermal insulating properties and stiffness, the surface of the molded article comprising a layer having a non- or low-foamed, dense cellular structure and the inside of the molded article comprising a fine, uniform high-foamed layer.

BACKGROUND ART

As a process of injection molding foamable plastics, Japanese Patent Kokai Sho 62-246710 discloses an injection molding process wherein a mold to be connected to the injection port of an injection molding machine consists of a stationary mold part and a movable mold part, a cavity formed therebetween can be enlarged and reduced by moving the movable mold part, and before a foaming agent is injected into the mold from the injection molding machine, the cavity is enlarged to a predetermined size by making the movable mold part go backward.

Further, Japanese Patent Kokai Hei 4-214311 discloses an injection compression molding process wherein a mold relatively movable to the direction of enlarging or reducing the cavity volume is placed in the position of reducing the predetermined cavity volume, the mold is moved to the direction of enlarging the cavity volume while injecting a foamable molten resin into the cavity by maintaining the pressure of preventing the resin from foaming, the resin is compressed by moving the mold to the direction of reducing the cavity volume, the surface of the resin is cooled to solidify, the resin pressure is lowered to that of initiating the foaming by moving again the mold to the direction of enlarging the cavity volume, thereby foaming the resin within the cavity, and after cooling, a molded article is removed.

In such prior processes, however, the problem remains that the molded article of good appearance is not produced. The cause in the former process will be considered as mentioned below. Since the cavity volume is enlarged at the same time as the injection, a cell collapse occurs at the surface portion of the molded article and the surface having a non- or low-foamed, dense cell structure is not obtained. In case of using a mold having the cavity structure with a thin-wall at the position away from the gate, it is difficult to completely fill the mold. The cause in the latter process will be considered as mentioned below. In case of using the mold having the cavity structure with a thin-wall at the position away from the gate (e.g. the mold for the molded article having a large flat area, ribs and bosses) and a conventional molding machine, it is difficult to maintain the pressure of the foamable plastic so as to prevent it from foaming. If the injection is performed at a high-speed and a high-pressure using a large molding machine or a counter-pressure process is used in combination therewith, the foamable plastic can be, of course, maintained at the pressure of preventing it from foaming. However, the problem remains on economy.

Further, the prior processes have the problems that in the production of the molded article having a large flat area, a thin-walled rib and wall surface or boss at the end portion, the resin cannot be completely filled to the end portion of the molded article (what is called "short shot"), which results in the occurrence of defective and no production of the molded article having a dense surface and good appearance.

The cause of the above problem will be considered as mentioned below. In either of the above prior processes, the cavity is enlarged at the same time as injection or in the middle of injection, that is, the volume of the cavity to be filled is increased in the middle of resin feeding. If said operation is conducted with the cavity having a large flat area, the case may occur where the feed rate of resin cannot follow the rate of increasing the cavity volume. In such situation, it is very difficult that the pressure of the resin to be fed within the cavity is kept constant and the resin cannot be prevented from the initiation of foaming. With the cavity having the shape as above in which the resin feed pressure more than a predetermined value is required for the filling to the end portion, short shot is inevitable. Even if the cavity is compressed again after it was enlarged, most of the resin foaming is already completed at that time. In the step of compressing the cavity, therefore, the cell produced by foaming is only compressed and the effect of filling a fluid resin to the end portion cannot be expected.

For the same reasons as mentioned above, a reduction of resin pressure within the cavity will promote foaming in the middle of feeding the resin, so that the cell produced by foaming will rupture successively at the front portion of the feeding resin, leaving traces on the surface of the molded article, with no production of the molded article of good appearance.

To prevent the reduction of pressure as mentioned above, a counter-pressure process has been employed together wherein a compressed gas is previously sealed into a mold to keep constant the pressure at the front portion of the fluid resin. Even in such a case, there is a phenomenon that a resin flow apparently stops or goes backward at the flat area of the cavity in connection with the feed rate of the resin and the speed of increasing the cavity volume, so that the trace or mark appears on the surface of the molded article, leading to poor appearance of said article.

To remove such drawbacks of prior art processes, there is no other way but to limit the shape of the molded article to bar, column or the form having sufficient thickness to the thickness direction relative to the projection area of the flat portion. That is, the production of a good molded article by the processes comprising the step of enlarging the cavity at the same time as injection or in the middle of injection is under the restraint that the shape of the molded article is restricted to the narrow range.

Thus, the present invention is devised in view of such drawbacks of the prior art and the object of the invention is to provide an injection molding process of producing a molded plastic foam article having a light weight, good appearance and good stiffness, the surface of the molded article comprising a layer having a non- or low-foamed, dense cellular structure and the inside of the molded article comprising a high-foamed layer, by means of conventional injection molding machine using a mold having the cavity structure with a thin-wall at the position away from the gate.

DISCLOSURE OF INVENTION

The invention relates to a process of injection molding a foamable plastic composition which comprises the steps of:
  a) filling completely a molten foamable plastic composition into a cavity, while reducing a volume of the cavity in the middle of injection or immediately after injection;
  b) cooling the composition to the state wherein a solidified layer in contact with a mold surface mingles with a molten inside layer;

c) enlarging the volume of the cavity to that of the desired molded article; and d) after further cooling, removing the molded article.

The invention also relates to the molded plastic foam article produced by the above process.

BRIEF DESCRIPTION OF DRAWINGS

In FIG. 1, the location with which a pressure sensor for detecting the pressure within the mold is in contact is indicated at 1 and 2. The location at which the thickness at the top portion is measured is indicated at 7. In FIG. 2, the position of the gate is shown at 3, the boss is at 4 and the rib is at 5. The location at which the thickness at the top portion is measured is indicated at 6.

BEST MODE DESCRIPTION OF INVENTION

Figure 1:
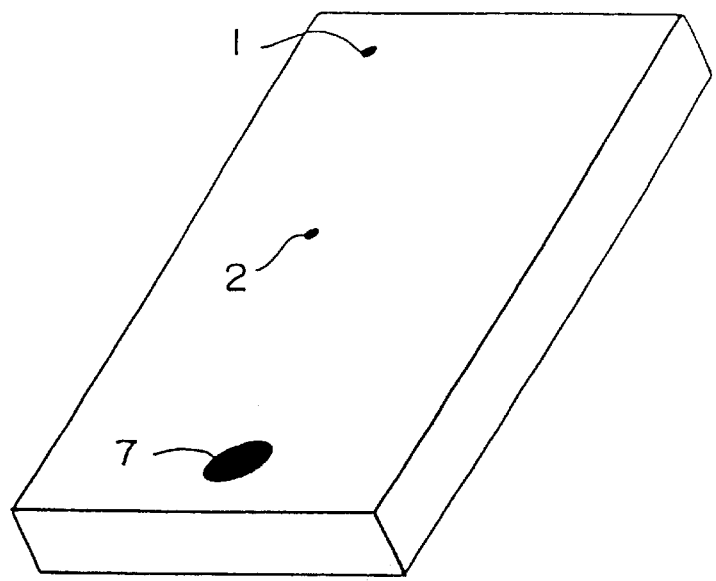
FIG. 1 is a perspective view showing the bottom of the molded article produced in the Examples of the present invention.

The foamable plastic composition used in the invention comprises thermoplastics and a foaming agent. The thermoplastics include polystyrene, polyethylene, polypropylene, polyvinyl chloride, polyvinylidene chloride, ABS resin, methacrylate resin, polyvinyl alcohol or the like. Polypropylenes include propylene homopolymer, propylene/α-olefin copolymer and propylene/α-olefin block copolymer. The foaming agents include an inorganic compound such as ammonium carbonate and sodium bicarbonate, and an organic compound such as azo compounds, sulfohydrazide compounds, nitroso compounds and azide compounds or the like. The azo compounds include azodicarbonamide (ADCA), 2,2'-azobisisobutyronitrile, azohexahydrobenzonitrile, diazoaminobenzene and the like. The sulfohydrazide compounds include benzene sulfonyl hydrazide, benzene-1,3-disulfonyl hydrazide, diphenylsulfone-3,3'-disulfonyl hydrazide, diphenyl oxide-4,4'-disulfonyl hydrazide and the like. The nitroso compounds include N,N'-dinitroso-pentamethylenetetramine (DNPT), N,N'-dimethyl terephthalate and the like. The azide compounds include terephthalazide, p-tert.butyl-benzazide and the like.

The foamable plastic composition used in the invention can be prepared, for example, by dry blending thermoplastics and 0.5–5% by weight of a foaming agent based on the weight of the thermoplastics using a tumbler or the like.

The reduction of the cavity volume conducted in the present invention will be explained by using the following designations: A refers to a volume of a cavity at the time when the injection is initiated, B refers to a volume of a cavity at the time when the volume was reduced in the middle of injection or immediately after injection (the reduction was completed) and C refers to a volume of a cavity at the time when the volume was enlarged to the volume (dimensions) of a desired molded article (the enlargement was completed). In practice, volume B is equivalent to a value obtained by dividing volume C by an average foaming magnification. Volume A is equivalent to 1.1–5 times, preferably 1.5–3 times as large as volume B. The molding process using less than 1.1 times as large as volume B is not preferable, since the pressure gradient on the foamable plastic composition at the time of filling is increasing, so that no uniform filling can be accomplished and no molded plastic foam article of good appearance can be produced. Further, the molding process using more than 5 times as large as volume B is not preferable, since the pressure on the foamable plastic composition at the time of injection drops temporarily and foaming begins prior to completion of filling, so that no molded plastic foam article of good appearance can be produced.

The enlargement of the cavity volume can be accomplished, for instance, by the movement of the mold by a clamping mechanism of the mold injection machine or the movement of a slide core mounted on the mold. This change of the cavity volume can be manually operated, but it can be desirably controlled by the mechanism itself of the molding machine or mold. If the increase in the cavity volume is carried out by the movement of the mold by the clamping mechanism of the injection molding machine, it is preferable that the injection molding machine has such a controlling mechanism that the mold can be arbitrarily moved or ceased during the operation of molding. If the increase in the cavity volume is carried out by the movement of the slide core, it is preferable that the injection molding machine has the mechanism that can control arbitrarily the movement of the slide core.

An example of the methods of completely filling the composition into the cavity can include a method of injecting the composition into the cavity in an amount of 50–100% by volume, preferably 80–100% by volume, most preferably 90–100% by volume, based on volume B and then reducing the cavity volume.

In the process of the present invention, cooling the contents of the cavity to the state wherein the solidified layer in contact with the mold surface mingles with the molten inside layer can be carried out, for instance, by maintaining the state of volume B for 1–15 seconds after reduction of the cavity volume and completion of the injection filling, using the cooling mechanism for the injection mold.

The foamable plastic composition used in the invention may be compounded, if necessary, with antioxidants, ultraviolet absorbers, antistatic agents, coloring agents, olefin elastomers and inorganic fillers such as talc, to such an extent as not to impair the object of the invention.

The process of the present invention is characterized in that the cavity is still at the reduced position in the course of injecting the molten foamable plastic composition into the cavity, and after completion of filling the composition into the cavity at the reduced position, the operation of cooling/enlargement of cavity/re-cooling is carried out. Thus, the molded articles produced by this process are those having good appearance and thermal insulating properties, etc., in which the surface comprises a layer having a non- or low-foamed, dense structure and the inside comprises a high-foamed layer.

The causes of producing the layer having the non- or low-foamed, dense structure on the surface of the molded article will be presumed as explained below. Since the volume of the cavity is still reduced until the step b) of the process and thereafter the reduced volume is maintained, in other words, an enlargement of the cavity volume is not performed, an injection pressure and injection dwell will be transmitted to the end portion of the molten foamable plastics which has been filled by injection into the cavity. Further, a mold pressure will be transmitted by the reduction of the cavity volume. The molten foamable plastics at this state will be at non- or low-foamed state. Then, the plastics in such a state are subjected to the step of cooling to the state wherein the solidified layer in contact with the mold surface mingles with the molten inside layer, upon which the molten foamable plastics in contact with the mold are cooled in a non- or low-foamed state as they are, and they transfer the surface of the mold. Thereafter, no foaming will occur even if the cavity volume is increased. As a result, there will be produced a molded article, the surface of which has the layer of the non- or low-foamed, dense structure, i.e., the article having good appearance. In view of the above-mentioned fact that the injection pressure and injection dwell will be transmitted to the end portion of the molten foamable plastics which was filled by injection to the cavity, it is possible to fill the molten foamable plastics to the thin-wall part, with the ease of complete filling, even when there is employed the mold having the cavity structure with a thin-wall at the position away from the gate. Of course, the cooling step is accomplished until the state wherein the solidified layer in contact with the mold surface mingles with the molten inside layer, so that foaming of the molten inside layer occurs in the subsequent step c) of the process. In further step d), the molten layer is cooled to solidify the inside, which results in the production of the molded article, the inside of which comprises the high-foamed layer.

The invention is further illustrated by the following examples and comparative examples in which the following compositions, injection molding machine and mold are used.

Composition

This composition was prepared by mixing 100 parts by weight of a propylene homopolymer having a melt flow rate of 2.5 g/10 minutes based on test condition 14 of JIS K 7210 (230° C., 21.18N) and a melting point of 165° C. with 3 parts by weight of azodicarbonamide (ADCA) under agitation using a tumbling mixer.

Injection Molding Machine

There was used an injection molding machine provided with a cylinder of 90 mm screw diameter and a mold clamping mechanism with a maximum mold clamping force of 650T.

Mold

Figure 2:
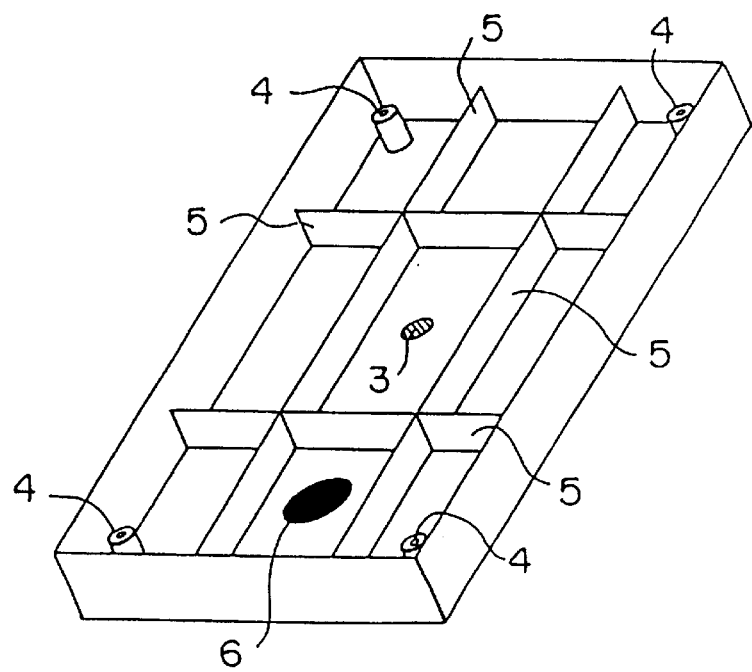
FIG. 2 is a perspective view showing the inside of the molded article produced in the Examples of the present invention.

A mold was used for the manufacture of the molded article shown in FIGS. 1 and 2. The mold has cross ribs and bosses at four corners and a box type cavity having the size of 410 mm in length, 295 mm in width and 50 mm in height, in which a parting part of the mold is of a fitting type and the volume of the cavity is changeable at the moving location of the mold. A pressure sensor for the measurement of the internal pressure was arranged on the mold surface in contact with the locations indicated at 1 and 2 in FIG. 1 to measure the pressure of the plastics within the cavity.

The characteristics shown in the following examples and comparative examples were evaluated by the following methods.

Maximum Pressure in the Neighborhood of the Gate

A pressure sensor for the measurement of the internal pressure was arranged on the mold surface in contact with the location indicated at 2 in FIG. 1 to measure a maximum pressure on molding. The measured value was expressed as the maximum pressure in the neighborhood of the gate (unit: MPa).

Maximum Pressure at the End Portion

A pressure sensor for the measurement of the internal pressure was arranged on the mold surface in contact with the location indicated at 2 in FIG. 1 to measure a maximum pressure on molding. The measured value was expressed as the maximum pressure at the end portion (unit: MPa).

Filling Evaluation

The molded articles obtained in the examples and comparative examples were compared with the following standard article to evaluate the configuration. In case where the configuration is identical with that of the standard article, it is expressed as "G". In case where the configuration is different from that of the standard article, it is expressed as "N".

Standard Article: This article was produced by using polypropylene having a melt flow rate of 30 g/10 minutes based on test condition 14 of JIS K 7210 (230° C., 21.18N), the molding machine and mold used in the examples in the following manner. The cylinder temperature of the injection molding machine was set at 230° C., and the coolant temperature of the mold was set at 70° C. 780 g of said polypropylene was injected into the cavity with the volume of 869 cc. After completion of injection, the cavity was cooled for 30 seconds and the mold was opened to remove a molded article. This molded article was used as the standard article.

Appearance

The molded articles obtained in the examples and comparative examples were compared with the above standard article to evaluate the surface profile. In case where the surface profile is identical with that of the standard article, it is expressed as "G". In case where the surface profile is apparently different from that of the standard article and unevenness was observed on the surface, it is expressed as "N".

Cell Structure

Figure 3:
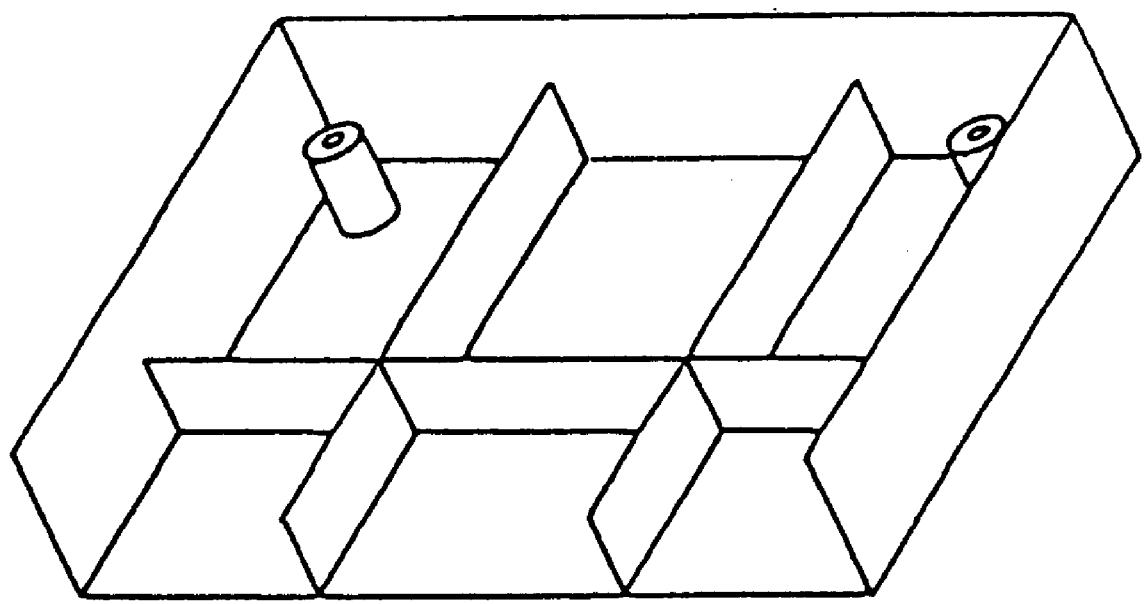
FIG. 3 is a partial cutaway view of the molded article for the evaluation of cell structure in the Examples of the present invention.

The resultant molded article was cut as shown in FIG. 3 to observe a cell structure of the cross section. In case where the cell size is uniform, it is expressed as "G". In case where the cell size is not uniform, it is expressed as "N".

Stiffness

Each 15 mm×119 mm specimen was cut from the molded article and a flexural test was carried out in accordance with JIS K7203. A maximum flexural load was served as an indication of the stiffness (unit: N).

EXAMPLE 1

The molding was performed using the composition, injection molding machine and mold as mentioned above and further setting the cylinder temperature of the molding machine at 230° C. and the coolant temperature of the mold at 70° C., by the following procedure.

(i) 420 g of the composition was injected into a cavity measuring 590 cc in volume and 2.7 mm in a space between the mold surface (movable mold) in contact with the location indicated at 7 in FIG. 1 and the mold surface (stationary mold) in contact with the location indicated at 6 in FIG. 2, which is abbreviated hereafter as "the thickness at the top portion". The injection was completed after 3 seconds.

(ii) In the course of injection, the reduction of the cavity volume was started 1.5 second after injection and completed after 2 seconds so that the thickness at the top portion of the cavity became 1.7 mm and the volume became 470 cc.

(iii) After completion of the reduction in cavity volume, cooling was conducted for 10 seconds. Subsequently, an enlargement of the volume was started and completed 1.5 second after start so that the thickness at the top portion of the cavity became 5.0 mm and the volume became 869 cc.

(iv) After completion of the enlargement of cavity volume, cooling was conducted for 60 seconds and the mold was opened to remove a molded article having the size of 410 mm in length×295 mm in width×52.8 mm in height and the volume of 869 cc, as shown in FIG. 1.

The characteristics and maximum pressure on molding (measured value) of the resultant molded article are shown in Table 1.

EXAMPLE 2

The molding was performed by a similar procedure as mentioned in Example 1, except that the injection in step (i) was conducted into a cavity having the volume of 712 cc and the thickness of 3.7 mm at the top portion. There was obtained a molded article having the size of 410 mm in length×295 mm in width×52.8 mm in height and the volume of 869 cc.

The characteristics and maximum pressure on molding (measured value) of the resultant molded article are shown in Table 1.

EXAMPLE 3

The molding was performed by a similar procedure as mentioned in Example 1, except that in step (i) the reduction of the cavity volume was initiated at the same time as completion of the injection and completed after 2 seconds to give the volume of 470 cc. There was obtained a molded article having the size of 410 mm in length×295 mm in width×52.8 mm in height and the volume of 869 cc.

The characteristics and maximum pressure on molding (measured value) of the resultant molded article are shown in Table 1.

Comparative Example 1

The molding was performed using the composition, injection molding machine and mold as mentioned above and further setting the cylinder temperature of the molding machine at 220° C. and the coolant temperature of the mold at 70° C., by the following procedure.

(i) 420 g of the composition were injected into a cavity having the thickness of 1.7 mm at the top portion and the volume of 470 cc and the injection was completed after 3 seconds.

(ii) After completion of the injection, cooling was conducted for 10 seconds and then an enlargement of the volume was initiated. 1.5 second after initiation, the enlargement of the volume was completed so that the thickness at the top portion of the cavity became 5.0 mm and the volume became 869 cc.

(iii) After completion of the enlargement of the cavity volume, cooling was conducted for 60 seconds, and the mold was opened to remove a molded article having the size of 410 mm in length×295 mm in width×52.8 mm in height and the volume of 869 cc, as shown in FIG. 1.

The characteristics and maximum pressure on molding (measured value) of the resultant molded article are shown in Table 1.

Comparative Example 2

The molding was performed using the composition, injection molding machine and mold as mentioned above and further setting the cylinder temperature of the molding machine at 220° C. and the coolant temperature of the mold at 70° C., by the following procedure.

(i) 420 g of the composition were injected into a cavity having the thickness of 5.0 mm at the top portion and the volume of 869 cc and the injection was completed after 3 seconds.

(ii) 120 seconds after completion of the injection, the mold was opened to remove a molded article having the size of 410 mm in length×295 mm in width×30 mm in height and the volume of 715 cc, as shown in FIG. 1.

The characteristics and maximum pressure on molding (measured value) of the resultant molded article are shown in Table 1.

Comparative Example 3

The molding was performed using the composition, injection molding machine and mold as mentioned above and further setting the cylinder temperature of the molding machine at 230° C. and the coolant temperature of the mold at 70° C., by the following procedure.

(i) 420 g of the composition were injected into a cavity having the thickness of 1.7 mm at the top portion and the volume of 470 cc and the injection was completed after 3 seconds.

(ii) In the course of injection, an enlargement of the cavity volume was initiated just after the injection and completed after 3 seconds so that the thickness at the top portion of the cavity became 3.5 mm and the volume became 690 cc.

(iii) After completion of the injection, the reduction of the cavity volume was initiated and completed after 2 seconds so that the thickness at the top portion of the cavity became 2.5 mm and the volume became 570 cc.

(iv) After completion of the reduction of the cavity volume, the enlargement of the cavity volume was initiated and completed after 1 second so that the thickness at the top portion of the cavity became 5 mm and the volume became 869 cc.

(v) After completion of the enlargement of the cavity volume, cooling was conducted for 60 seconds and the mold was opened to remove a molded article having the size of 410 mm in length×295 mm in width×50 mm in height and the volume of 820 cc.

The characteristics and maximum pressure on molding (measured value) of the resultant molded article are shown in Table 1.

TABLE 1

|  | Maximum pressure in the neighborhood of gate | Maximum pressure at the end portion | Filling evaluation | Appearance | Cell structure | Stiffness |
|---|---|---|---|---|---|---|
| Example |  |  |  |  |  |  |
| 1 | 15.4 | 2.8 | G | G | G | 170 |
| 2 | 15.4 | 3.5 | G | G | G | 170 |
| 3 | 12.1 | 5.9 | G | G | G | 170 |
| Comparative Example |  |  |  |  |  |  |
| 1 | 24.4 | 8.7 | G | G | N | 170 |
| 2 | — | — | N | N | N | 100 |
| 3 | 11.2 | 9.3 | N | N | N | 120 |

As shown in Table 1, the processes of Examples 1–3 can conduct the molding by which the maximum pressures in the neighborhood of the gate and at the end portion are kept lower. The resultant molded articles were excellent in all respects of appearance, filling evaluation and cell structure. On the other hand, the process of Comparative Example 1 performs the molding by which the maximum pressures in the neighborhood of the gate and at the end portion are kept higher. The resultant molded articles are 10. not uniform in the cell structure, and therefore, the process is not suitable for the molding process of the present invention. The process of Comparative Example 2 is not suitable for the molding process of the present invention, since the resultant molded article is not good in the filling evaluation, appearance and foaming magnification. Further, the process of Comparative Example 3 is not suitable for the molding process of the present invention, since the resultant molded article is not good in the filling evaluation and appearance.

INDUSTRIAL APPLICABILITY

The injection molding processes according to the present invention do not require high injection speed and pressure upon molding and can produce the molded articles of good appearance which have a non- or low-foamed layer on the surface and a high-foamed layer at the inside. The molded articles produced by such processes have a light weight and good thermal insulating properties, thus being suitable for use as automobile parts, household appliances, industrial parts or the like.

What is claimed is:

1. A process of injection molding a foamable plastic composition which comprises the steps of:
   a) filling completely a molten foamable plastic composition into a cavity, and reducing the volume of the cavity in the middle of injection or immediately after injection, so that the volume of the cavity at the time of initiating the injection (Volume A) is equivalent to 1.1–5 times as large as the volume of the cavity at the time reduction is completed (Volume B);
   b) cooling the composition to the state wherein a solidified layer in contact with a mold surface mingles with a molten inside layer;
   c) enlarging the volume of the cavity to that of the desired molded article; and
   d) after further cooling, removing the molded article wherein the produced molded article has all of its surfaces made from the injected foamable plastic composition.

2. The process of claim 1 wherein the foamable plastic composition comprises thermoplastics and a foaming agent.

3. The process of claim 2 wherein the foamable plastic composition further comprises antioxidants, weatherproof agents, ultraviolet absorbers, antistatic agents, coloring agents, olefin elastomers, and inorganic fillers.

4. The process of claim 2 wherein 0.5–5% by weight of a foaming agent is incorporated based on the weight of the thermoplastics.

* * * * *